Patented Sept. 26, 1933

1,928,438

UNITED STATES PATENT OFFICE 1,928,438

PROCESS FOR MANUFACTURING HIGH-MELTING WAX PRODUCTS

Walther Schrauth, Berlin, Germany

No Drawing. Application June 1, 1931, Serial No. 541,546, and in Germany February 15, 1930

8 Claims. (Cl. 87—19)

It is well known that the hydrogenated (hardened) castor oil chiefly consisting of 12-oxy-stearic-acid-triglyceride has a melting point which is similar to that of carnauba wax. Nevertheless, the product can not be used instead of carnauba wax as it lacks the waxy character, having a crystalline structure, because of which it crumbles. Besides it has not the capacity for binding solvents which fits carnauba wax for manufacturing shoe blacking, polishing wax, etc. A shoe blacking made from 1 part hardened castor oil and 3 parts turpentine oil lacks the smooth appearance of a carnauba wax cream, shows crystalline formations and can easily be decomposed to the crystalline glyceride and the cognate solvent.

I have found, however, that the hardened castor oil can very well be used for manufacturing preparations similar to carnauba wax, if it is fused or applied together with hydrocarbon derivatives which melt not much below 70° C. and especially with oxy- or hydroxy-compounds or with chlorine derivatives. The products obtained in this way have the appearance, the shelly fracture and the solvent (turpentine) binding ability of the genuine carnauba wax, and externally they can scarcely be distinguished from the same. Also the melting points are very near to those of carnauba wax which melts at approximately 85° C.

A product thoroughly appropriate for the manufacture of shoe blacking and polishing waxes is obtained for example by fusing 80 parts hardened castor oil with 20 parts behenone (freezing point 923°. If this product is dissolved in 3 parts turpentine oil or similar solvents or solvent mixtures used in the shoe blacking and polishing wax industries, a rigid cream-like mass without crystalline separations is obtained which shows all properties of the commonly used shoe blacking and polishing wax agents and similar products. Instead of the above mentioned behenone, and not less successfully, the ketone of other fatty acids can be used, as for example stearone (freezing point 88°) or montanone. But quite the same result is secured by using instead of the ketones, high melting alcohols of the aliphatic rank, as for example pentatiakontanol-18 (freezing point 92°), hentriakontanol-16 (freezing point 85,6°), etc. or high melting derivatives of such alcohols, e. g. the oxalic-acid-dimyricyl-ester (91°) or the palmitic-acid-ceryl-ester (79°). Further, it is not at all necessary to use only chemically pure products; a small acidity or other impurities are not harmful if the melting point of the additional substances is not decidedly below 70°. Therefore, such additional substances may eventually be used, too, which, as for example oxidized montan-wax, contain considerable quantities of high melting ketone-like compounds, etc.

The same results are obtained, if, instead of the aforesaid oxygen compounds, the chlorine derivatives of hydrocarbons with at least 10 carbon atoms are used.

Excellent preparations are obtained, for example, if 80 parts of hardened castor oil are melted together with 20 parts naphthalene tetrachloride.

Instead of hardened castor oil, the glycolic esters or the mono- and di-glycerides of 12-oxy-stearic acid can be used, the melting points of which do not differ from the melting point of triglycerides.

I claim:

1. A high melting wax product consisting principally of approximately four parts of hydrogenated castor oil and one part of a material of the group consisting of behenone, stearone, montanone, pentatiakontanol-18, hentriakontanol-16, oxalic acid dimyricyl ester, palmitic acid ceryl ester and naphthalene tetra-chloride and containing also a small proportion of a solvent.

2. A high melting wax product consisting of approximately 80 parts of hydrogenized glyceride of the group consisting of castor oil, mono-, and di-glyceride of 12-oxy-stearic acid, 20 parts of a material of the group consisting of behenone, stearone, montanone, pentatiakontanol-18, hentriakontanol-16, oxalic acid dimyricyl ester, palmitic acid ceryl ester and naphthalene tetra-chloride together with three parts of turpentine, substantially as described.

3. The process of manufacturing high melting wax products similar to carnauba wax which comprises combining material of the group consisting of the glycol and glycerol esters of 12 oxy-stearic acid with compounds of the group consisting of ketones of fatty acids, alcohols, aliphatic esters, and naphthalene tetra-chloride having a melting point approximating 70° C. or higher.

4. A high melting wax product consisting chiefly of an ester of an alcohol of the group consisting of glycol and glycerol and 12 oxy-stearic acid combined with an aliphatic alcohol having a melting point approximating 70° C. or higher.

5. A high melting wax product consisting chiefly of an ester of an alcohol of the group consisting of glycol and glycerol and 12 oxy-stearic acid combined with naphthalene tetra-chloride.

6. A high melting wax-like product consisting principally of approximately four parts of hydrogenated castor oil and one part of material of the group consistig of aliphatic ketones and aliphatic esters having a melting point approximating 80 to 90° C.

7. A high melting wax-like product consisting principally of four parts of hydrogenated castor oil and one part of an aliphatic alcohol having a melting point approximating 80 to 90° C.

8. A high melting wax-like product comprising hydrogenated castor oil and an ingredient of the group consisting of ketones of fatty acids, aliphatic alcohols, aliphatic esters and naphthalene tetra-chloride and having a melting point approximating 80 to 90° C., together with a small proportion of a solvent in approximately the proportions of four parts of castor oil to one part of the remainder.

WALTHER SCHRAUTH.